July 14, 1936.  R. B. DAY  2,047,859
VENTED RUBBER ARTICLE
Original Filed Sept. 4, 1931
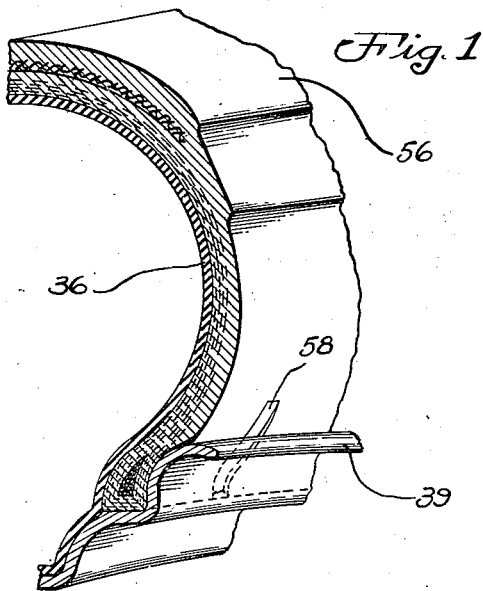
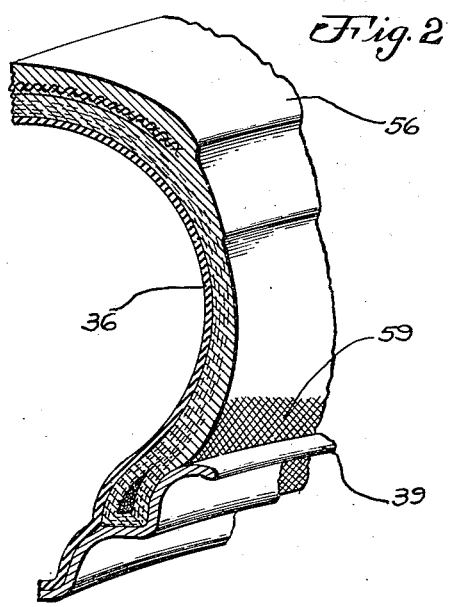
Inventor
Ralph B. Day
By
Attorney Patented July 14, 1936

2,047,859

UNITED STATES PATENT OFFICE 2,047,859

VENTED RUBBER ARTICLE

Ralph B. Day, Akron, Ohio, assignor to Wingfoot Corporation, Wilmington, Del., a corporation of Delaware Original application September 4, 1931, Serial No. 561,122. Divided and this application September 29, 1934, Serial No. 746,228. In Canada May 26, 1932

4 Claims. (Cl. 152—13)

This invention relates to improvements in rubber articles and more particularly to pneumatic tires wherein fluid pressure is utilized to expand the tire while in use on vehicles. This application is a division of my applications Serial 561,122, filed September 4, 1931 and Serial 631,202, filed August 31, 1932.

Heretofore it has been customary in building pneumatic tires to provide a tire which, when mounted on a rim and inflated is practically impervious to gases and which will not permit the escape of any fluid contained therein. Likewise, it has been customary to provide an impervious rim for this impervious tire. The inflation of this impervious tire is usually accomplished by means of a separate inflatable inner tube disposed therein or by means of an inner tube permanently secured or mounted integrally with the inner wall of the tire in a structure known as a single tube tire.

In using this impervious tire and rim on a vehicle, numerous obstacles have been encountered. For example, there is a natural seepage of the inflating fluid through the inner tube and into the carcass of the tire and the latter being impervious does not permit the escape of this seeping fluid. The impervious rim also prevents escape of this fluid and as a consequence the fluid permeates the cords of the carcass and tends to flow along and through these cords, but as the fluid cannot escape through the relatively thick sidewalls or tread it forms blisters in the walls of the tread and frequently causes blowouts at these points. Likewise, tubes occasionally have small holes, such as pin holes therein, through which the fluid passes into the carcass and similar troubles occur.

I have discovered that if some means is provided to permit the escape to the atmosphere of fluids contained within or entering into the carcass of the tire, or to permit the escape of fluids from the structure after they have seeped or leaked through the tube and before they enter the carcass, many, if not all, of the troubles incident to the action of such fluids will be overcome, and tires provided with such means are herein referred to as "vented" tires. There are many ways of venting a tire, such as by exposing the cords or fibrous material of the carcass directly to the atmosphere, or by interposing additional pervious material between the carcass and the atmosphere, thereby indirectly venting the tire. A few of the many ways are herein described.

It is an object of this invention to provide a pneumatic tire in which the sidewalls and tread portion will not be subject to blister formation or blow-outs from the fluid within the tire.

Another object is to provide a pneumatic tire which is not pervious to fluid contained within the tire, and which has leaked or seeped through the tube.

A further object is to provide a pneumatic structure provided with novel means for venting the tire.

Other objects and advantages will become apparent from the following description.

Fig. 1 is a fragmentary perspective view showing one form of vented tire, and—

Fig. 2 is a similar view showing a modified form of vented tire.

Referring now to the drawing:

Fig. 1 shows a portion of a tire 56 of the usual construction provided with one or more grooves 58, which pass transversely of the beads, or wholly or partially across the bottom of the beads and upwardly on the sidewall of the tire to a point above the rim flange 39. While only a fragmentary portion of a tire, tube and rim has been illustrated it will be understood that a complete structure is contemplated but was not deemed necessary in order to illustrate the invention. In this embodiment of the invention, seeping fluids and the like will pass from the interior of the tire under the beads, and/or puncture from the carcass through the thin layer of rubber surrounding the beads and along the grooves 58 to the atmosphere.

In the modified form of the invention shown in Fig. 2, I have shown a tire provided with one or more knurled or roughened portions 59, extending in the same manner as the grooves previously described, whereby a plurality of small intercommunicating passageways will be provided around the beads and sidewall to vent the tire.

It is believed to be apparent that I have provided a novel pneumatic tire and novel means for venting such a tire.

Although I have illustrated two preferred forms of the invention and have described those forms in detail, it will be apparent to those skilled in the art that the invention is not so limited that various modifications can be made therein without departing from the spirit of the invention or from the scope of the sub-joined claims.

What I claim is:

1. In a vulcanized pneumatic tire including sidewalls and bead portions one or more grooves arranged directly on at least one of said sidewalls and having its inner end extending at least partially beneath the heel of the adjacent bead portion but not past the inner rim-contacting portion of the bead, while its outer end extends into a position on the side wall such as to be exposed to the atmosphere when said tire is on said rim to provide one or more passageways for bleeding fluids from within the tire carcass.

2. In a unit comprising an inflated tire and tube and a rim, said tire including sidewalls and bead portions and said rim including tire retaining flanges, one or more grooves arranged directly on at least one of said sidewalls, the outer end of said groove or grooves extending beyond the adjacent rim flanges and the inner end thereof extending at least to the heel of the adjacent bead but not past the inner rim-contacting portion of the bead to provide one or more passageways for bleeding fluids from within the tire carcass.

3. A unit of the class described, comprising a rim having peripheral bead seats thereon, and a tire having side walls terminating in beads, said beads having seat cooperating portions thereon conforming to said seats at least sufficiently to form line contact therewith throughout the entire peripheries thereof, said tire having one or more grooves with one end of said groove or grooves extending at least partially under at least one of said beads but not extending entirely past its seating portion and cooperating rim seat to form one or more passageways for bleeding fluids from within the tire carcass, the other end of said groove or grooves being exposed to the atmosphere.

4. A unit of the class described, comprising a rim having peripheral bead seats thereon and a tire having side walls terminating in beads, said beads having seat cooperating portions thereon conforming to said seats at least sufficiently to form line contact therewith throughout the entire peripheries thereof, said tire having one or more grooves with one end of said groove or grooves extending at least to the heel of at least one of said beads, but not extending entirely past its seating portion and cooperating rim seat, to form one or more passageways for bleeding fluids from within the tire carcass, the other end of said groove or grooves being exposed to the atmosphere.

RALPH B. DAY.